United States Patent [19]

Bowles et al.

[11] Patent Number: 4,992,528
[45] Date of Patent: Feb. 12, 1991

[54] LIGHT WEIGHT POLYMER MATRIX COMPOSITE MATERIAL

[75] Inventors: Kenneth J. Bowles, Lakewood; Carl E. Lowell, North Olmsted, both of Ohio

[73] Assignee: The United States of America, as represented by the Administrator of the National Aeronautics and Space Administration, Washington, D.C.

[21] Appl. No.: 279,624

[22] Filed: Dec. 5, 1988

[51] Int. Cl.$^5$ ................................................ C08K 3/36
[52] U.S. Cl. ................................. 528/481; 523/309; 528/501; 528/503
[58] Field of Search ............... 528/481, 503, 501; 523/307, 309

[56] References Cited

U.S. PATENT DOCUMENTS

| | | | |
|---|---|---|---|
| 4,016,140 | 4/1977 | Morello | 260/47 CP |
| 4,136,084 | 1/1979 | Dieck et al. | 528/481 |
| 4,145,526 | 3/1979 | Vanlautem et al. | 528/481 |
| 4,167,620 | 9/1979 | Chen | 528/481 |
| 4,395,514 | 7/1983 | Edelman | 524/600 |
| 4,401,590 | 8/1983 | Yoshimura et al. | 252/514 |
| 4,411,826 | 10/1983 | Naarmann et al. | 528/481 |
| 4,497,728 | 2/1985 | Yoshimura et al. | 252/514 |
| 4,550,130 | 10/1985 | Kishida et al. | 524/495 |
| 4,560,742 | 12/1985 | Pater | 528/342 |
| 4,709,009 | 11/1987 | Fujiwara et al. | 528/481 |
| 4,898,754 | 2/1990 | Christensen et al. | 523/309 |

OTHER PUBLICATIONS

NASA TM 100922, "A Thermally Modified Polymer Matrix Composite Material with Structural Integrity to 371° C.", K. J. Bowles-Sep. 1988.

*Primary Examiner*—Lewis T. Jacobs
*Assistant Examiner*—Christopher P. Rogers
*Attorney, Agent, or Firm*—Gene E. Shook; John R. Manning; James A. Mackin

[57] ABSTRACT

A graphite fiber reinforced polymer matrix is layed up, cured, and thermally aged at about 750° F. in the presence of an inert gas. The heat treatment improves the structural integrity and alters the electrical conductivity of the materials. In the preferred embodiment PMR-15 polyimides and Celion-6000 graphite fibers are used.

5 Claims, 4 Drawing Sheets

LIGHT WEIGHT POLYMER MATRIX COMPOSITE MATERIAL

ORIGIN OF THE INVENTION

The invention described herein was made by employees of the United States Government and may be manufactured and used by or for the Government for governmental purposes without the payment of any royalties thereon or therefor.

TECHNICAL FIELD

This invention is concerned with improving the structural integrity of fiber reinforced composites that are made with thermally treated polymers as their matrices and are exposed to air at high temperatures. The invention is further concerned with the production of components that can be used at temperatures well above those that can be tolerated by current state-of-the-art polymer matrix materials.

The projected material needs for aircraft propulsion systems for the near future are processable low density polymer matrix composites which are thermo-oxidatively and structurally stable at a temperature of 700° C. and possibly 800° C. Conventional polymer matrix composite materials cannot meet these requirements.

A state-of-the-art high temperature polymer matrix for use in advanced composites is a polyimide described in U.S. Pat. No. 3,745,149 and known commercially as PMR-15. When this polyimide is used with high modulus graphite fibers, the resulting composites can be used for long periods of time at 550° F. and for shorter periods of time at 600° F. At this higher temperature the interlaminar shear strength is about 50% of the value at room temperature. At higher temperatures the value decreases even more.

As with other polymer matrix composites the use-temperature limit, as determined by structural integrity, for PMR-15 is limited by the $T_G$ of the resin. The $T_G$ designates the temperature at which the matrix changes from an elastic material (below $T_G$) to a rubbery material (above $T_G$) As a rubbery material with an extremely low modulus, the matrix can no longer transfer loads from fiber to fiber, and the composite stiffness or structural integrity is lost. The $T_G$ of PMR-15 is one of the hightest of the state-of-the-art engineering polymers and is normally about 635° F. Inasmuch as the transition at the $T_G$ is not sharp, but occurs over a finite temperature range, even short excursions near 635° F. can result in the loss of structural integrity for PMR-15 matrix composites.

Most composite materials are literally composed of fibers that are cemented together with an organic polymer matrix. Therefore, the electrical resistivity across the composite, perpendicular to the plane in which the fibers lie, is very much dependent on the resistivity of the matrix material. As an example, Celion 6000/PMR-15 composites have a resistivity of 25.4 ohn-cm across the fibers and 0.0346 ohm-cm parallel to the plane of the fibers. The highly conductive Celion 6000 graphite fibers dominate in producing a low resistivity in the direction parallel to the fiber axes. Most organic fibers have high resistivities and therefore the resistivity through the thickness of a composite plate is also high.

Often the structure materials that are used in aircraft components must have low electrical resistivities to dissipate lightning strike voltages, to provide a path for grounding electrical and electronic circuits, and possibly for providing a medium for resistance heating anti-icing and deicing techniques. The low electrical resistivity suggests that such new materials may also possess high thermal conductivity characteristics. This would enable state-of-the-art anti-icing and deicing techniques to be used with these composite materials that are required for the aircraft of the future.

It is, therefore, an object of the present invention to provide a method for using thermal processing of polymer matrix materials to bring about changes in their properties.

Another object of the invention is to utilize thermal processing technology to significantly improve the structural integrity of fiber reinforced composites that are made with thermally treated polymers as their matrices are exposed to very high temperatures.

A further object of the invention is to change the chemical structure of polymer matrix materials to increase the $T_G$ above the desired use temperature.

A still further object of the invention is to remove those volatiles that are always produced during the pyrolsis of organic matrices at a rate slow enough that blistering will not occur within the composite.

Still another object of the invention is to decrease the electrical resistivity and possibly raise the thermal conductivity of the polymeric material by converting this material to a more electrical conducting, possibly semi-carbonaceous material.

BACKGROUND ART

U.S. Pat. No. 4,016,140 describes a heat treatment in a temperature range between 300° F. and 700° F. prior to molding. This treatment provides a molecular weight increase necessary for good copolymer properties and more complete imidization of the polymers. In addition, this treatment prevents the formation of water vapor which would cause void formation later in the molding step.

U.S. Pat. No. 4,167,620 to Chen describes the heat treating of polyimide resins to improve their physical properties. The process is used to remove volatiles generated and contained within the polyamide-amides and polyamic acids that will cause voids, delaminations and warping of a structure made from this material when heated to near the heat deflection temperature. A circulating gas is used to help flush the volatiles from the solid. The treatment is likewise a post cure which promotes oxygen enhanced crosslinkings within the polymer to increase the heat deflection temperature about 30° F.

Yoshimura et al Pat. Nos. 4,401,590 and 4,497,728 are both concerned with processes which alter the conductivity of polyimides.

This is accomplished by heating the material to a temperature between 400° C. and 1,000° C.

Pater Pat. No. 4,560,742 describes the standard post cure for a polyimide PMR-15 matrix composite. The heating does not take place in an inert atmosphere and the composite material is heated to a temperature as high as 600° F.

Edelman Pat. No. 4,395,51is directed to graphite reinforced polyimide resin materials having improved structural properties. After lay-up, the composite material is heated to temperatures as high as 635° F. for comparatively short periods of time and not in an inert atmosphere. The main objective is to reduce curing temperature from 600° F. to a temperature of about 350° F. to 450° F.

DISCLOSURE OF THE INVENTION

The present invention relates to graphite fiber reinforced polyimide resin materials for structural use above 550° F. The materials are heat treated at about 750° F. in the presence of an inert gas. This heat treatment improves the structural integrity and alters the electrical conductivity of the materials.

The processing is done on a fabricated structure after the lay-up and curing has been completed. This material can be used for short times at temperature well above the current limit of 550° F. at which existing high temperature polyimide matrix materials can operate for extended periods.

Unlike present day polymer matrix composites, the materials produced by the thermal processing of the present invention will not experience large reductions in mechanical properties, such as stiffness and strength, as temperature increases past 600° F. and even past 700° F. The materials can be used at temperatures well beyond current limits while retaining low temperature structural integrity.

In addition to the superior high temperature performance exhibited by the materials produced by the present process, the processing procedure also alters the electrical resistivity of the percursor composite matrix material. The thermal processing decreases the electrical resistance significantly which increases the value of the material, particularly in the aerospace industry. Such a processing produces certain metal-like properties in polymer based materials.

BRIEF DESCRIPTION OF THE DRAWINGS

The objects, advantages and novel features of the invention will be more fully understood from the following detailed description when read in connection with the accompanying drawings wherein.

BEST MODE FOR CARRYING OUT THE INVENTION

Changes in chemical structure are obtained by the controlled thermal degradation of a polymer which produces improvements in high temperature mechanical properties and electrical properties over those of the starting material. Heat transfer properties also may be improved.

This controlled thermal degradation can be easily incorporated without the necessity for the development of new processing technology. Controlled thermal degradation is really a chemical structure change and can be compared to the metallurgical transformations caused by annealing and other types of heat treatments.

Figure 1:
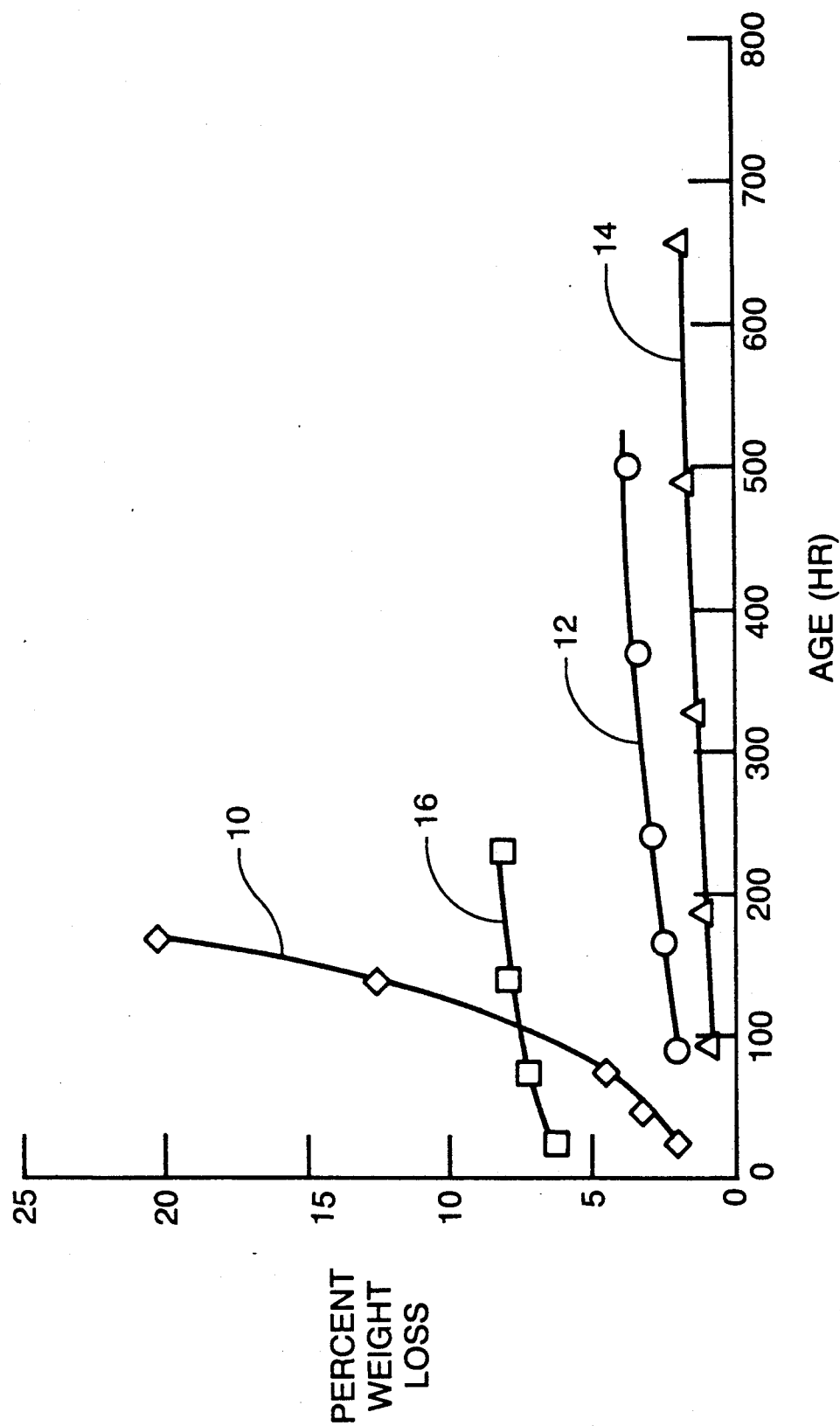
FIG. 1 is a graph showing nitrogen and air aging of Celion 6000/PMR-15 composites.

The process itself entails the thermal aging of a fully-cured graphite fiber reinforced polymer matrix composite in an inert gas, such as nitrogen or argon, or in a vacuum. The aging must take place at a temperature above the projected use temperature of the proposed structure. The length of the thermal treatment must be enough to insure that further treatment will not result in further weight loss as illustrated in FIG. 1 which shows nitrogen and air aging. A particular weight loss value is characteristic for a particular material at a particular temperature.

Referring again to FIG. 1, the aging of a Celion 6000/PMR-15 composite in 371° C. in air is shown by the line 10, while the aging of this composite in nitrogen at this temperature is shown by the line 12. Agings of this composite in nitrogen at 343° C. and 427° C are shown by the lines 14 and 16 respectively.

Figure 2:
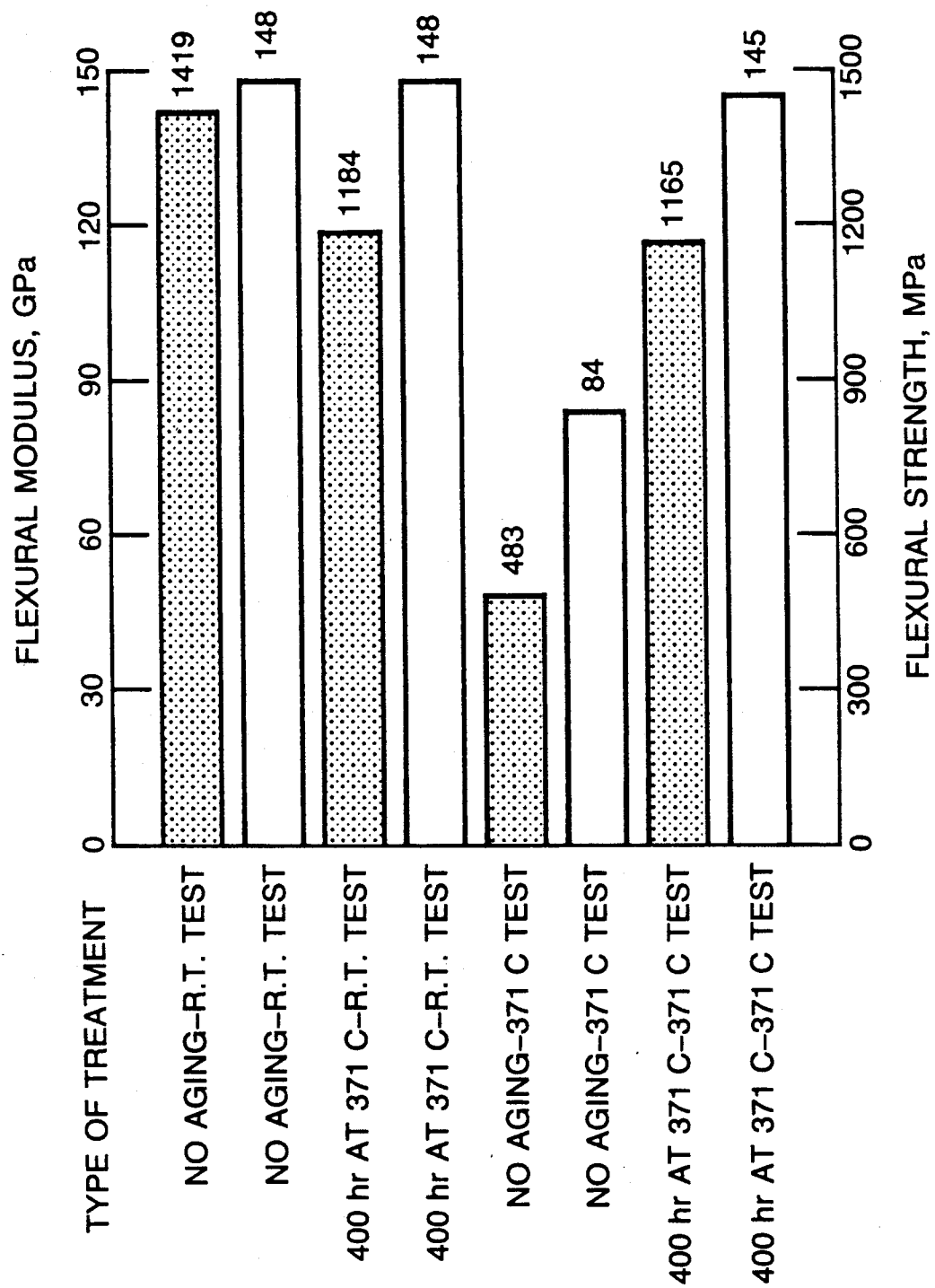
FIG. 2 is a bar chart illustrating the improvement in high temperature flexural properties achieved with thermal treatment of Celion 6000/PMR-15 composites.

The beneficial technical effects of the process is illustrated by the results of testing Celion 6000/PMR-15 unidirectional composites. Interlaminar shear strengths of treated and untreated composites are listed in Table I. Flexural strengths and moduli of treated and untreated Celion 6000/PMR-15 unidirectional composites are shown in FIG. 2.

TABLE I

| | Interlaminar Shear Strength (Ksi) |
|---|---|
| Post cured and no aging. | 17.2 |
| Post cured and aged in $N_2$ at 700° F. for 335 hrs. room temp test. | 16.9 |
| Post cured and aged in $N_2$ at 700° F. for 335 hrs. and at 800° F. for 230 hrs. room temp test. | 8.8 |
| Post cured and no aging. Tested at 700° F. | 4.0 |
| Post cured and aged 335 hrs. at 700° F. 700° F. test. | 11.1 |
| Post cured and aged 335 hrs. at 700° F. and 800° F. for 230 hrs. 700° F. test. | 7.7 |

Flexural properties of the composites are listed in Table II.

TABLE II

| | Flex Strength (Ksi) | Flex Mod. (Msi) |
|---|---|---|
| Post cured and unaged. Tested at room temp. | 205.8 | 21.5 |
| Post cured and aged 335 hrs. at 700° F. Tested at room temp. | 171.8 | 21.5 |
| Post cured and unaged. Tested at 700° F. | 70.2 | 12.2 |
| Post cured and aged 335 hrs. at 700° F. Tested at 700° F. | 169.0 | 21.0 |

Room temperature resistivities of the composites are listed in Table III.

TABLE III

| | Resistivity (ohm-Cm) |
|---|---|
| Post cured and no aging. | 25.4 |
| Post cured and aged 335 hrs. in $N_2$ at 700° F. | 3.1 |
| Post cured and aged 600 hrs. in $N_2$ at 700° F. | 1.36 |

Selected properties of PMR-15 neat resin are listed in Table IV.

TABLE IV

| Density post cured and no aging. | 1.32 gm/cc |
|---|---|
| Density after 293 hrs. at 700° F. in nitrogen. | 1.29 gm/cc |
| Calculated voids after 293 hrs. at 700° F. nitrogen. | 1.2% in |
| Dimensional change after 293 hrs. at 700° F. in nitrogen. | −2.2% |
| Flex. mod. unpostcured and no aging. | 553 Ksi |

TABLE IV-continued

| | |
|---|---|
| Flex. mod. no post cure after 293 hrs. at 700° F. in nitrogen. Tested at 700° F. | 354 Ksi |
| Flex. str. no post cure after 293 hrs at 700° F. in nitrogen. Tested at 700° F. | 2.7 Ksi |
| Flex. mod. post cured after 293 hrs. at 700° F. in nitrogen. | 608 Ksi |
| Flex. str. post cured after 293 hrs. at 700° F. in nitrogen | 10.3 Ksi |
| Flex. strain to fail post cured after 293 hrs. at 700° F. in nitrogen. | 1.69% |
| Weight loss at 650° F. | 3.7% |
| Weight loss at 700° F. | 7.0% |
| $T_G$ No aging post cured. | 644° F. |
| $T_G$ aged at 700° F. 335 hrs. in nitrogen. | 896° F. |

Figure 3:
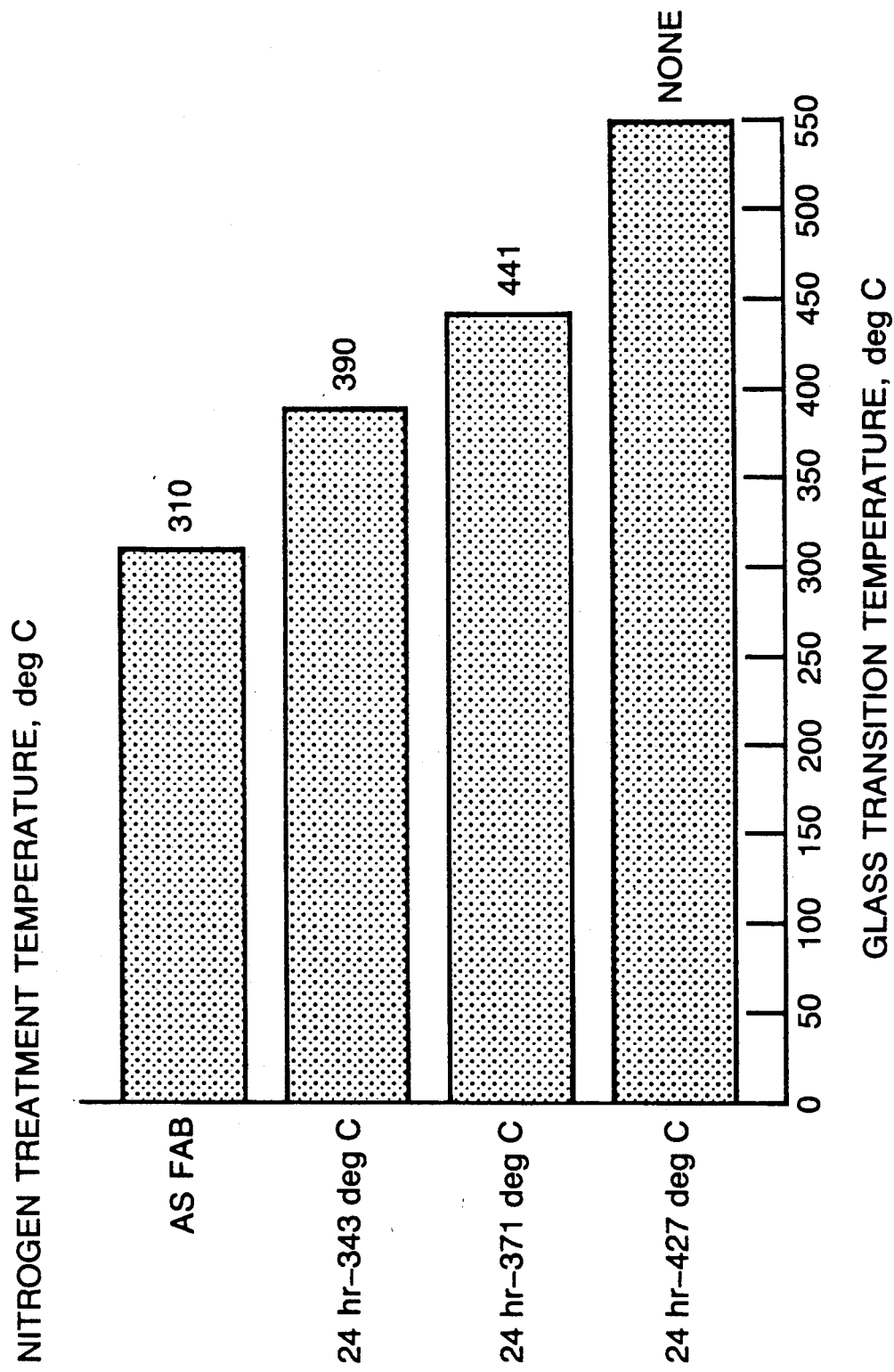
FIG. 3 is a bar chart illustrating the increase in glass transition temperature obtained with nitrogen treatment.

From the examples it is seen that the process provides material which has structural integrity at temperatures well above the $T_G$ of the parent material. These changes in $T_G$ are shown in FIG. 3. Also, no new processing developments are required to fabricate structures from the material produced by this invention.

Figure 4:
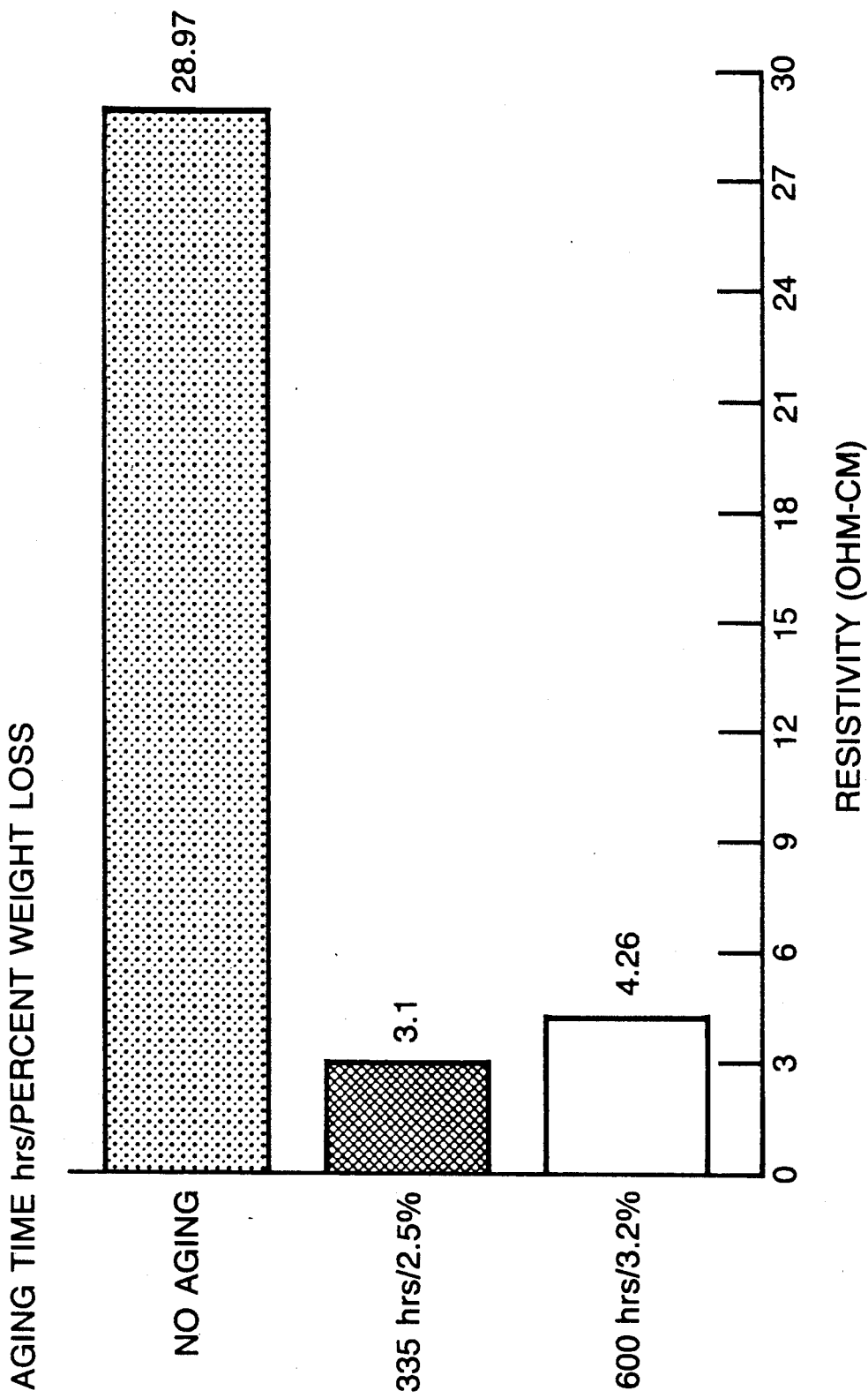
FIG. 4 is a bar chart illustrating the composite resistivity changes during isothermal aging in nitrogen at 700° F.

The process of the invention provides a method for altering and controlling the electrical resistance of a compositie within finite limits that are determined by the parent composite material. These changes are shown in FIG. 4. When coupled with a suitable protective coating, the material produced in accordance with the present invention can be used at temperatures of 700° F. and above for long periods of time.

While the preferred embodiment of the invention has been disclosed and described, it will be appreciated that various modifications may be made to the invention without departing from the spirit thereof or the scope of the subjoined claims.

We claim:

1. A method of altering the properties of a fully cured polyimide matrix composite having a glass transition temperature comprising the steps of placing said composite in an inert atmosphere at ambient pressure, heating said composite to a temperature higher than the glass transition temperature of said composite whereby said composite loses weight, and maintaining said composite at said temperature in said inert atmosphere until said weight loss is substantially completed.

2. A method as claimed in claim 1 wherein the composite is heated in an inert gas.

3. A method as claimed in claim 2 wherein the composite is heated in nitrogen.

4. A method as claimed in claim 2 wherein the composite is heated in argon.

5. A method as claimed in claim 2 wherein the composite is heated to a temperature of about 750° F.

* * * * *